United States Patent [19]
Watanabe et al.

[11] 4,340,125
[45] Jul. 20, 1982

[54] STABILIZED MOTOR VEHICLE

[75] Inventors: Masaki Watanabe, Urawa; Hiroshi Shimoyama, Fujimi; Keiji Suzuki, Tokyo, all of Japan

[73] Assignee: Honda Giken Kogyo Kabushiki Kaisha, Tokyo, Japan

[21] Appl. No.: 134,570

[22] Filed: Mar. 27, 1980

[30] Foreign Application Priority Data

Apr. 5, 1979 [JP] Japan .................................. 54-41344
Apr. 6, 1979 [JP] Japan ............................. 54-45384[U]

[51] Int. Cl.³ ......................... B62D 61/08; B62K 5/02
[52] U.S. Cl. .................................................. 180/215
[58] Field of Search ............... 180/210, 215, 219, 225, 180/216, 217, 211, 212, 213

[56] References Cited
U.S. PATENT DOCUMENTS 1,056,073  3/1913  Wall ..................................... 180/216
3,016,967  1/1962  Rehfeld ............................... 180/219

FOREIGN PATENT DOCUMENTS 1482387   4/1967   France ............................... 180/215
2002481  10/1969   France ............................... 180/215
1907 of 1908 Ad.19485  United Kingdom ................ 180/225
165182    6/1921   United Kingdom ................ 180/225
210642    2/1924   United Kingdom ................ 180/225

*Primary Examiner*—John A. Pekar
*Attorney, Agent, or Firm*—Irving M. Weiner; Pamela S. Burt; John L. Shortley

[57] ABSTRACT

A three-wheeled motorcycle having a front body portion including a relatively low floor which carries a fuel tank and a battery which are located on a floor having footrests, and below a reference level tangential to the front and rear wheels at their upper edges. The fuel tank and battery are covered with an upper hood and a lower protective cover. With the relatively heavy fuel tank and battery being disposed at a relatively low level, the motorcycle is stabilized for improved maneuverability during driving and parking, and has a wide space available for driver's activity or storing baggage.

7 Claims, 10 Drawing Figures

STABILIZED MOTOR VEHICLE

BACKGROUND OF THE INVENTION

1. Field of the Invention

The present invention relates to a motor vehicle, and more particularly to a motorcycle having a battery and fuel tank container located so as to enhance the stability and maneuverability of the motorcycle during parking and driving thereof.

2. Prior Art

Although not specifically shown or described, a three-wheeled motor vehicle disclosed in U.S. Pat. No. 3,776,353 issued Dec. 4, 1973 appears to require that a battery and a fuel tank be disposed at an elevated position between rear wheels because of structural limitations.

The prior motorcycles and motor vehicles are disadvantageous in that the elevated battery and fuel tank occupy a wide space, and tend to be a source of interference with the driver's activity or storage of baggage. The aforesaid U.S. Pat. No. 3,776,353 relies on the driver's weight to stabilize the motor vehicle when making abrupt turns.

SUMMARY OF THE INVENTION

A motor vehicle according to the present invention includes a fuel tank and a battery mounted on a vehicle body at a position below a reference level which is tangential to a front wheel and at least one rear wheel at their upper edges. The vehicle body includes a casing located below the reference level and accommodating therein at least the fuel tank, or preferably both the fuel tank and the battery. The casing is disposed centrally on a floor and between a pair of laterally spaced footrests of the floor, the floor being part of the vehicle body which is well below the reference level or substantially in horizontal alignment with the axes of the front and rear wheels. The casing comprises a trough-shaped cover and a hood between which the fuel tank and preferably the battery are interposed.

It is an object of the present invention to provide a motor vehicle having a low center of gravity for increased stability and maneuverability during driving and parking.

Another object of the present invention is to provide a motor vehicle which is rapidly restorable to its normal posture after rapidly restorable turning.

Still another object of the present invention is to provide a motor vehicle having a battery, fuel tank or other heavy parts storable at the feet of the driver for increased space availability at higher levels.

The above and other objects, features and advantages will become apparent from the following description when taken in conjunction with the accompanying drawings which show certain preferred embodiments by way of illustrative example.

DETAILED DESCRIPTION

Figure 1:
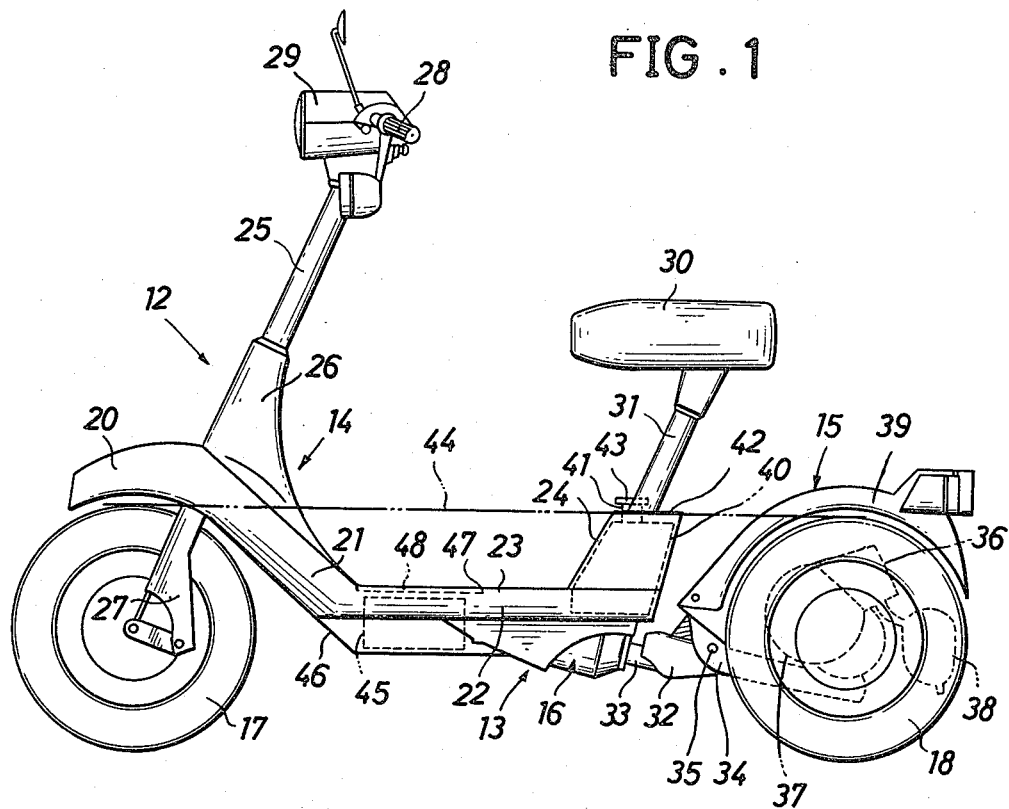
FIG. 1 is a side elevational view of a motor vehicle constructed according to an embodiment of the present invention.
Figure 2:
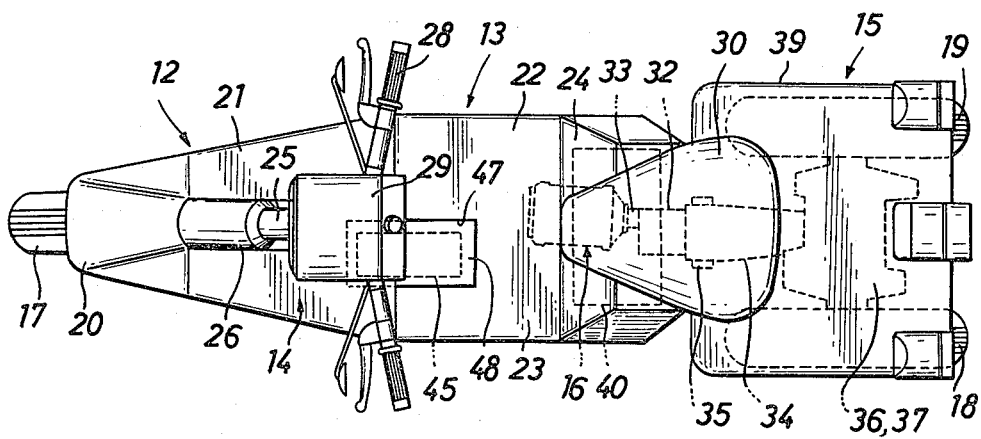
FIG. 2 is a plan view of the motor vehicle shown in FIG. 1.

FIGS. 1 and 2 show a three-wheeled motor vehicle or motorcycle 12 comprising a vehicle body 13 which includes a front body member 14 and a rear body member 15 interconnected by a pivotal joint 16 for limited relative angular movement about a shaft of the joint 16, a front wheel 17 rotatably supported on the front body member 14, and a pair of laterally spaced rear wheels 18, 19 rotatably supported on the rear body member 15.

The front body member 14 includes a front fender 20 overhanging the front wheel 17, a guard 21 extending rearwardly and downwardly from the front fender 20, and a flat horizontal floor 22 extending rearwardly from the guard 21 and lying at a relatively low level, or substantially in horizontal alignment with the axes of the front and rear wheels 17 and 18, 19. The front body member 14 thus takes substantially the same form as that of a motor scooter. The floor 22 has an upper surface 23 serving as a footrest. A casing 24 is mounted on the floor 22 at its rear portion and extends laterally across the floor 22, the casing 24 having a front wall serving as a foot guard for protection against injuries which would otherwise result from interference with the rear body member 15 while the latter is moving with respect to the front body member 14.

A steering column 25 is journalled by a bearing in a support 26 mounted on the guard 21. The steering column 25 has on its lower end a fork 27 on which the front wheel 17 is rotatably mounted, and on its upper end a tiller bar or handlebar 28 and a housing 29 accommodating a headlamp and instrumentation. A driver's seat 30 is mounted on a seat post 31 extending upwardly from the casing 24.

The rear body member 15 includes a connector frame 32 to which there is fastened a shaft 33 extending rearwardly from the pivotal joint 16, the housing of which is fastened to the floor 22 of the front body member 14. A support frame 34 is pivotally mounted on the connector frame 32 by a pin 35 and carries thereon an internal combustion engine 36, a casing 37 which houses a crankshaft and a transmission and speed-reducer mechanism, and a muffler 38; the engine 36, casing 37 and muffler 38 being interposed between the spaced rear wheels 18, 19 and located within an area defined by the circumference of the rear wheels 18, 19 when viewed in side elevation in FIG. 1. The rear body member 15 includes a rear fender 39 overhanging the rear wheels 18, 19.

A fuel tank 40 is disposed in the casing 24 and has a filler pipe 41 extending upwardly through an upper wall 42 of the casing 24 and closed by a cap 43. The fuel tank 40 is located below a reference level 44 tangential to the front and rear wheels 17 and 18, 19 at their upper edges. A battery 45 is disposed in the floor 22 and is covered by a trough-shaped protective cover 46 attached to the floor 22 from below, the floor 22 including an access opening 47 closed by a lid 48 and through which the battery 45 can be placed or removed. The floor 22 and hence the battery 45 are well below the reference level 44. Because the fuel tank 40, the battery 45, and the engine 36 are located below the reference level 44, at in a relatively low level, the motorcycle 12 is stabilized and can be easily maneuvered during driving and parking.

Figure 3:
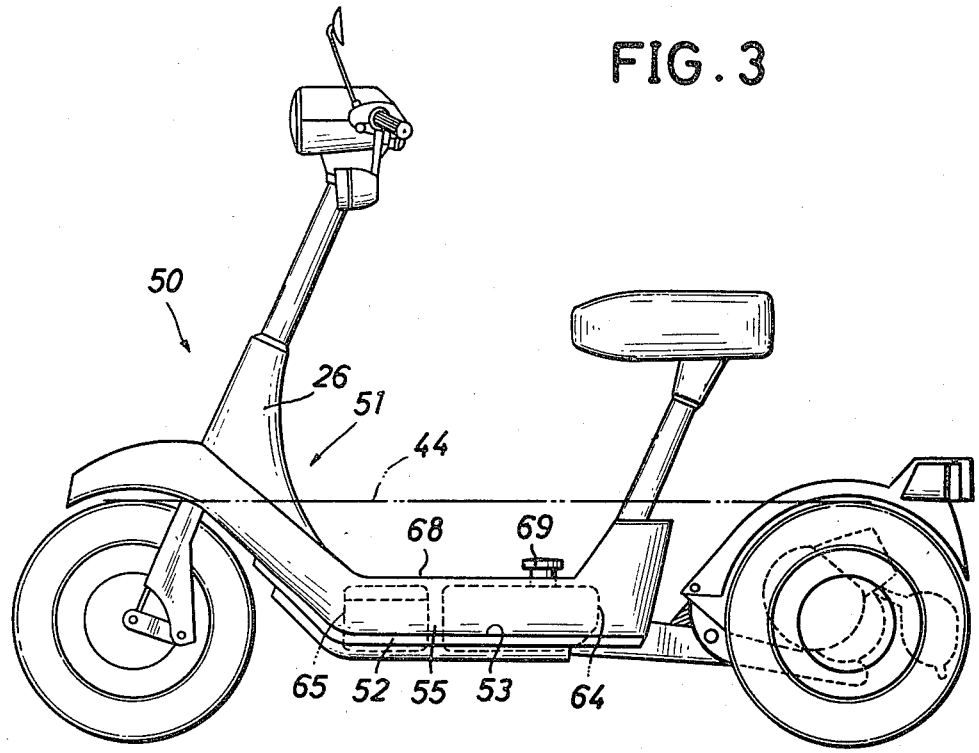
FIG. 3 is a side elevational view of a motor vehicle in accordance with another embodiment.
Figure 4:
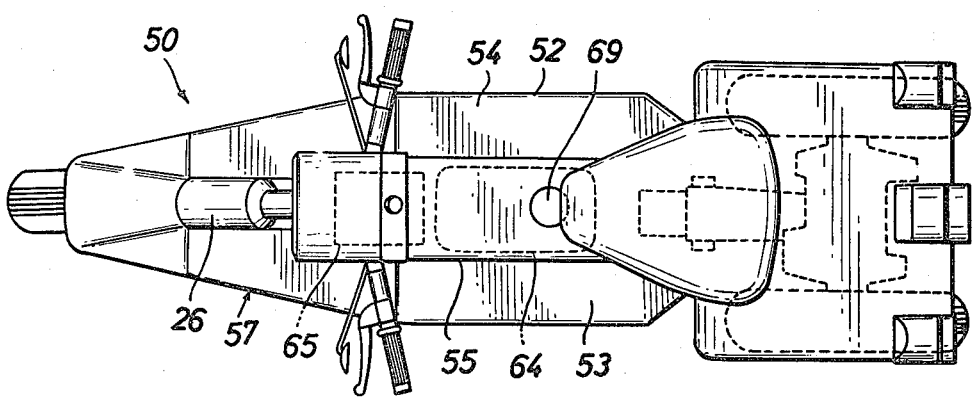
FIG. 4 is a plan view of the motor vehicle of FIG. 3.
Figure 5:
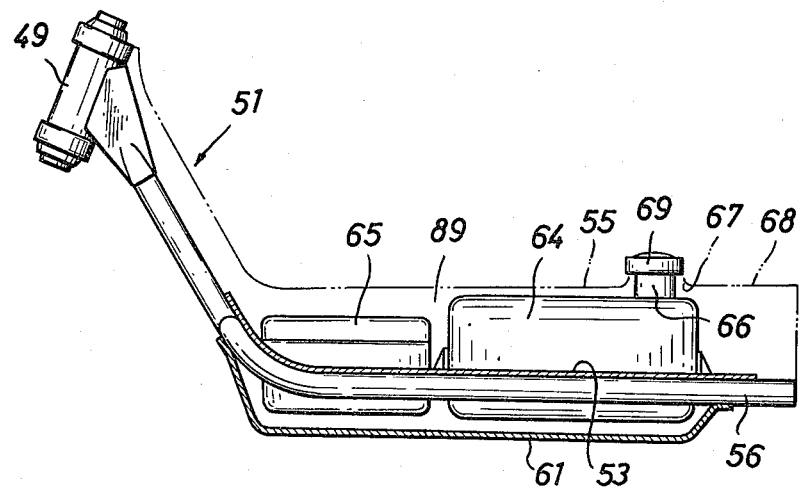
FIG. 5 is a side elevational view, with parts broken away, of a battery and fuel tank container of the motor vehicle illustrated in FIG. 3.
Figure 6:
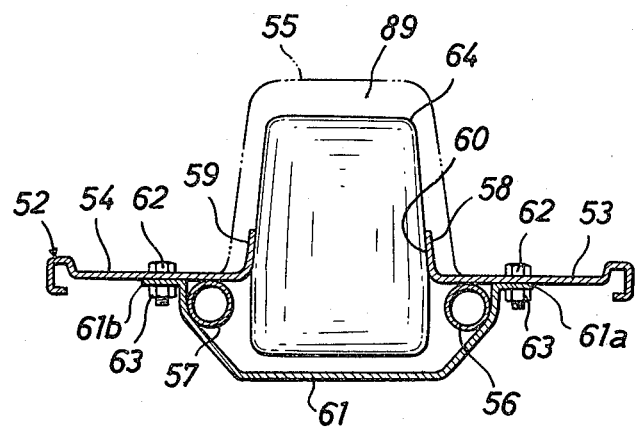
FIG. 6 is a transverse cross-sectional view of the container of FIG. 5.

FIGS. 3 and 4 show a three-wheeled motor vehicle 50 according to another embodiment of the present invention. The motor vehicle 50 includes a front body member 51 having a floor 52 with a pair of laterally spaced footrests 53, 54. A channel-shaped hood 55 extends longitudinally and is disposed between the footrests 53, 54. As better shown in FIGS. 5 and 6, the front body member 51 is supported by a pair of frame pipes 56, 57 extending from a steering column bearing 49 and spaced transversely from each other; the frame pipes 56, 57 mounting thereon the footrests 53, 54, respectively. The floor 52 has in its central portion a raised flange 58 extending upwardly and defining an opening 60 between the footrests 53, 54. The opening 60 is closed by a hood 55 disposed thereover. A trough-shaped protective cover 61 is located below the footrests 53, 54 and has a pair of lateral mounting fins 61a, 61b respectively fastened from below respectively to the footrests 53, 54 by bolts 62 and nuts 63 outwardly of the pipes 56, 57, respectively. The hood 55 and the cover 61 jointly define a space 89 in which there is accommodated a fuel tank 64 and a battery 65 disposed through the opening 60 in tandem relation and supported by the flange 58. A filler pipe 66 projects extends upwardly through a hole 67 in an upper wall 68 of the hood 55 and is closed by a cap 69. Accordingly, the fuel tank 64 and the battery 65 are substantially horizontally aligned with each other and with the axes of the front and rear wheels, and are located well below the reference level 44. With the fuel tank 64 supported at the same level as the battery 65, the motorcycle 50 is even more stable than the motorcycle 12 shown in FIGS. 1 and 2.

Figure 7:
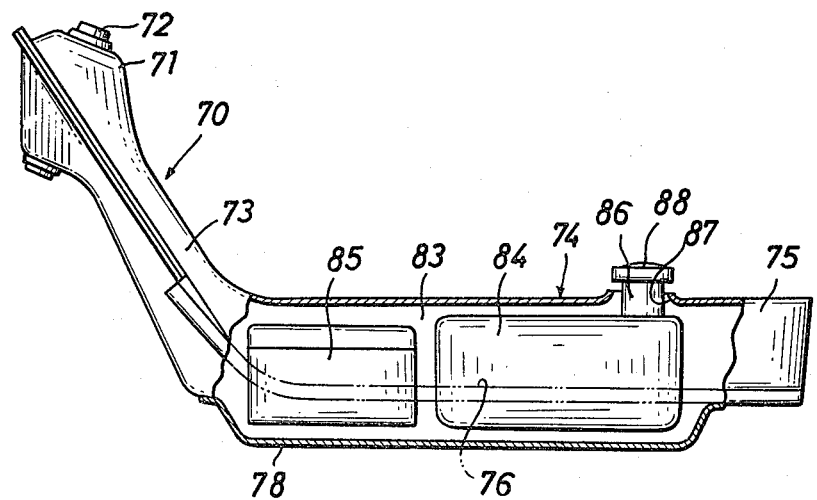
FIG. 7 is a side elevational view, partly cut away, of a modified battery and fuel tank container according to a the invention.
Figure 8:
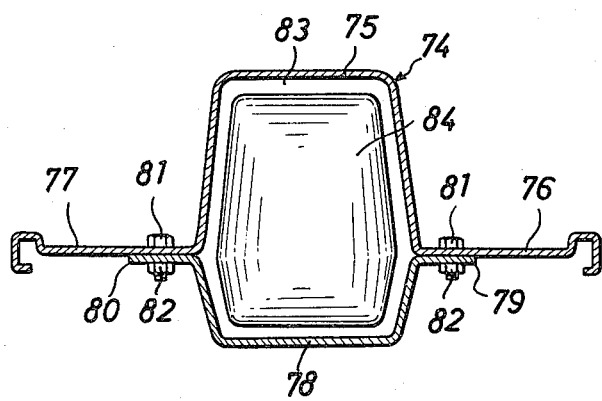
FIG. 8 is a transverse cross-sectional view of the container shown in FIG. 7.
Figure 9:
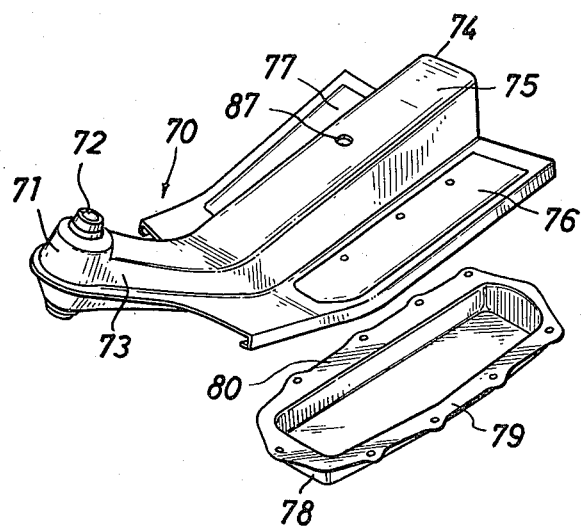
FIG. 9 is an exploded perspective view of the container of FIG. 7.

According to a further modification shown in FIGS. 7 through 9, a monocoque front body member 70 comprises a support 71 housing therein a steering column bearing 72, an arm 73 extending rearwardly and downwardly from the support 71, and a horizontal portion 74 extending rearwardly from the arm 73, the monocoque front body member 70 being formed of a pressed steel sheet. The horizontal portion 74 is composed of a central channel-shaped hood 75 and a pair of horizontal footrests 76, 77 extending away from each other from the hood 75. A trough-shaped protective cover 78 is fixed from below to the horizontal portion 74 by fastening a pair of mounting fins 79, 80 of the cover 78 respectively to the footrests 76, 77 by bolts 81 and nuts 82. The hood 75 and the cover 78 jointly provides a space 83 accommodating therein a fuel tank 84 and a battery 85. The fuel tank 84 has a filler pipe 86 projecting upwardly through a hole 87 in the hood 75 and closed by a cap 88.

Figure 10:
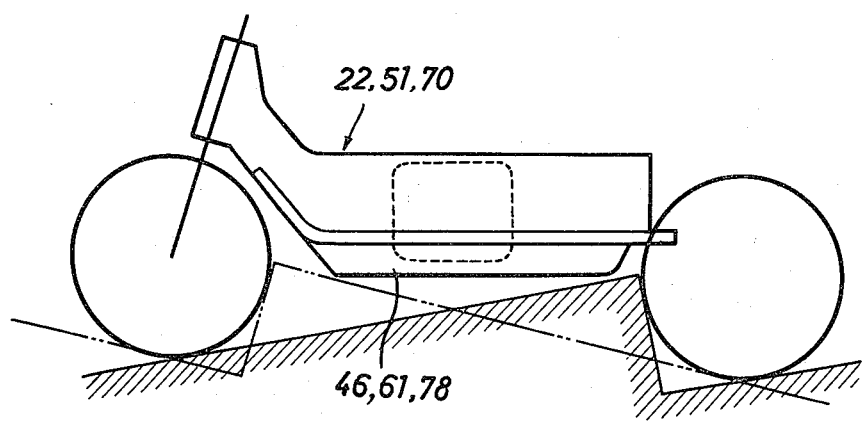
FIG. 10 is a schematic side elevational view of a motor vehicle of the present invention as it travels over stepped road surfaces.

In the foregoing embodiments, the fuel tank 64, 84 is located substantially centrally between the front and rear wheels so that the fuel tank is less subjected to stresses resulting from direct contact of the protective cover 46, 61, 78 with rough road surfaces when the motor vehicle travels over stepped roads as illustrated in FIG. 10.

Although not shown, the space 83, 89 provided by the hood 55, 75 and the cover 61, 78 is also available for housing other heavy parts or objects such as a tool box.

With the arrangement of the present invention, the fuel tank and/or the battery can be stored in the relatively low floor, with the results that the motor vehicle embodying the present invention has a lower center of gravity with resulting stability, has a wide space available for driver's activity or storing buggage, and has enhanced aesthetic appeal because the fuel tank and battery are covered and concealed from view.

Although certain preferred embodiments have been shown and described in detail, it should be understood that changes and modifications may be made without departing from the scope of the appended claims.

What is claimed is:

1. A three-wheeled motor vehicle comprising:
   a vehicle body;
   said vehicle body comprising a front body member and a rear body member which are interconnected for limited relative angular movement;
   a front wheel rotatably supported on said front body member;
   a pair of laterally spaced rear wheels rotatably supported on said rear body member, there being defined a reference level tangential to said front and rear wheels at the upper edges thereof;
   a motor supported on said rear body member and positioned between and drivingly connected to said rear wheels;
   relatively heavy parts, including a fuel tank and a battery, mounted on said front body member; and
   said motor and said relatively heavy parts being positioned below said reference level.

2. A motor vehicle according to claim 1, wherein:
   said vehicle body includes a floor disposed below said reference level and having a pair of laterally spaced footrests and a casing disposed between said footrests for accommodating therein said heavy parts, said floor being disposed substantially in horizontal alignment with the axes of said front and rear wheels;
   said floor has an opening between said footrests;
   said casing comprises a trough-shaped cover located below said opening and fixed to said footrests and a hood located over said opening; and
   said heavy parts are interposed between said cover and said hood through said opening.

3. A motor vehicle according to claim 2, wherein said hood is located downwardly of said reference level.

4. A motor vehicle according to claim 2, wherein said floor has a flange jointly defining said opening and extending upwardly into said hood, said flange jointly supporting said fuel tank.

5. A three-wheeled motor vehicle according to claim 1, wherein:
   said vehicle body includes a floor; and
   said fuel tank is mounted on said floor substantially in horizontal alignment with the axes of said front and rear wheels.

6. A three-wheeled motor vehicle according to claim 5, including a battery mounted on said body and located substantially in horizontal alignment with said fuel tank.

7. A motor vehicle comprising:
   a vehicle body;

a front wheel rotatably supported on and located forwardly of said vehicle body;
at least one rear wheel rotatably supported on and located rearwardly of said vehicle body, there being defined a reference level tangential to said front and rear wheels at the upper edges thereof;
a motor carried on said body and adjacent to said rear wheel and drivingly connected to said rear wheel;
a fuel tank mounted on said vehicle body at a position below said reference level;
said body including a floor located below said reference level and having a pair of laterally spaced footrests and a casing disposed between said footrests for accommodating therein said fuel tank, said floor being disposed substantially in horizontal alignment with the axes of said front and rear wheels;
said floor having an opening between said footrests;
said casing comprising a trough-shaped cover located below said opening and fixed to said footrests and a hood located over said opening;
said fuel tank being interposed between said cover and said hood through said opening;
said floor having a flange jointly defining said opening and extending upwardly into said hood; and
said flange jointly supporting said fuel tank.

* * * * *